(12) United States Patent
Paller et al.

(10) Patent No.: US 9,288,237 B2
(45) Date of Patent: Mar. 15, 2016

(54) GATEWAY AND A METHOD THEREIN FOR ENABLING SIP COMMUNICATION OVER A NON-STANDARD SIP TRANSPORT PROTOCOL

(75) Inventors: Gábor Paller, Budapest (HU); Markosz Maliosz, Budapest (HU); Hubert Przybysz, Hägersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 402 days.

(21) Appl. No.: 13/612,579

(22) Filed: Sep. 12, 2012

(65) Prior Publication Data

US 2013/0067102 A1   Mar. 14, 2013

Related U.S. Application Data

(60) Provisional application No. 61/534,961, filed on Sep. 15, 2011.

(30) Foreign Application Priority Data

Sep. 14, 2011   (EP) .................................... 11181229

(51) Int. Cl.
   *H04L 29/06*   (2006.01)
(52) U.S. Cl.
   CPC .......... *H04L 65/1036* (2013.01); *H04L 65/105* (2013.01); *H04L 65/1006* (2013.01)
(58) Field of Classification Search
   CPC .. H04L 65/105; H04L 65/1036; H04L 65/104
   USPC ....................................................... 709/228
   See application file for complete search history.

(56) References Cited

U.S. PATENT DOCUMENTS

| 2004/0131060 | A1* | 7/2004 | Newberg et al. ............... 370/390 |
| 2005/0047423 | A1* | 3/2005 | Kaul .................. H04L 29/06027 370/401 |
| 2005/0226225 | A1* | 10/2005 | Shigeta ............... H04M 7/0009 370/352 |
| 2006/0133392 | A1* | 6/2006 | Ajitomi et al. ................. 370/401 |
| 2006/0294242 | A1* | 12/2006 | Ozaki ............... H04L 29/06027 709/227 |

(Continued)

FOREIGN PATENT DOCUMENTS

| EP | 2007105 A1 | 12/2008 |
| EP | 2282502 A1 | 2/2011 |

OTHER PUBLICATIONS

Extended European Search Report, Application No. EP11181229.3, dated May 2, 2012, 6 pages.

(Continued)

*Primary Examiner* — Kevin Bates
*Assistant Examiner* — Mark A Scott
(74) *Attorney, Agent, or Firm* — Nicholson De Vos Webster & Eliott, LLP

(57) ABSTRACT

A protocol conversion gateway and a method therein for enabling a client, which client does not support a Session Initiation Protocol (SIP) transport protocol, to communicate with a SIP proxy are provided. The method comprises receiving a first SIP message, over a non-standard SIP transport protocol, from the client. The method further comprises inserting a SIP address of the protocol conversion gateway in at least one header of the received SIP message, and sending the SIP message to the SIP proxy over a standard SIP transport protocol.

16 Claims, 5 Drawing Sheets

(56) References Cited

U.S. PATENT DOCUMENTS

| | | | |
|---|---|---|---|
| 2007/0136413 A1* | 6/2007 | Ishikawa | H04L 29/06027 709/200 |
| 2007/0217430 A1* | 9/2007 | Baird | H04L 65/1069 370/395.52 |
| 2008/0080527 A1* | 4/2008 | Dorenbosch | H04L 45/00 370/401 |
| 2008/0232362 A1* | 9/2008 | Miyajima | H04L 29/12367 370/389 |
| 2008/0263212 A1* | 10/2008 | Goix et al. | 709/228 |
| 2009/0028138 A1* | 1/2009 | Lim | 370/356 |
| 2009/0161680 A1* | 6/2009 | Ishikawa et al. | 370/400 |
| 2009/0190573 A1* | 7/2009 | Siegel | H04L 65/1016 370/352 |
| 2009/0238168 A1* | 9/2009 | Lavoie | H04L 65/1046 370/352 |
| 2010/0085959 A1 | 4/2010 | Vohra et al. | |
| 2010/0146130 A1* | 6/2010 | Montemurro et al. | 709/228 |
| 2010/0157986 A1* | 6/2010 | Rao | H04L 29/1216 370/352 |
| 2010/0198975 A1* | 8/2010 | Willars et al. | 709/227 |
| 2011/0191483 A1* | 8/2011 | Zhu | H04L 65/104 709/228 |
| 2011/0213888 A1* | 9/2011 | Goldman et al. | 709/228 |
| 2011/0314166 A1* | 12/2011 | Axell et al. | 709/227 |
| 2012/0011273 A1* | 1/2012 | Van Elburg et al. | 709/238 |
| 2012/0042084 A1* | 2/2012 | Dutta et al. | 709/228 |
| 2013/0185445 A1* | 7/2013 | Larkin | 709/228 |

OTHER PUBLICATIONS

"3GPP TS 36.211, V9.1.0," 3rd Generation Partnership Project; Technical Specification Group Radio Access Network; Evolved Universal Terrestrial Radio Access (E-UTRA); *Physical Channels and Modulation (Release 9)*; Mar. 2010; 85pgs, 3GPP Organizational Partners; 650 Route des Lucioles, Sophia Antipolis, Valbonne, France.

* cited by examiner

GATEWAY AND A METHOD THEREIN FOR ENABLING SIP COMMUNICATION OVER A NON-STANDARD SIP TRANSPORT PROTOCOL

CROSS-REFERENCE TO RELATED APPLICATIONS

This application claims the benefit of EP Application No. 11181229.3, filed Sep. 14, 2011, and U.S. Provisional Application No. 61/534,961, filed Sep. 15, 2011, which are hereby incorporated by reference.

TECHNICAL FIELD

Embodiments herein relate generally to a gateway and a method therein for communication between a client and a SIP proxy and in particular to a gateway and a method therein for enabling SIP communication over a non-standard SIP transport protocol.

BACKGROUND

Communication networks and communication systems of today become more and more complex. Further, different communication networks and communication systems should be able to interact with each other to a high degree. One example is a user of a client being located in a communication network of a first type wanting to make use of a service being offered in a communication network of a second type.

A more specific example is a client in the Internet wanting to access a Session Initiation Protocol (SIP) service on a SIP based communication network. In this example, the Internet cannot comply with the requirements of the standard SIP transport protocols, such as Transmission Control Protocol (TCP) and User Datagram Protocol (UDP). The client only has access to Hypertext Transport Protocol (HTTP) protocol.

One example of a solution for enabling a client on one communication network to access a service on another communication network is using a gateway where an application-specific protocol is used, e.g. a Simple Object Access Protocol (SOAP), to send commands to a gateway and the gateway sends and receives the necessary signals, including SIP messages, to implements such a high-level functionality.

Another example is using a close mapping between the SIP messages and the HTTP messages. In this example, a mapping between HTTP session states—identified by cookies—and the SIP dialog and transaction states is used. This means the SIP messages and the HTTP messages have a one-to-one relationship to each other and the initiating HTTP message carries many elements of the resulting SIP message, e.g. Session Description Protocol (SDP) is directly transmitted over HTTP. The gateway, however, maintains and generates SIP dialog and transaction information, e.g. dialog tags and transaction branches.

Yet another example is transferring SIP messages over a chat protocol. However, this method does not achieve compatibility with standard SIP endpoint.

SUMMARY

It is an object of the exemplifying embodiments to address at least some of the problems outlined above. In particular, it is an object of the exemplifying embodiments to provide a protocol conversion gateway and a method therein for enabling a client, which client does not support a Session Initiation Protocol (SIP) transport protocol, to communicate with a SIP proxy. These objects and others may be obtained by providing a protocol conversion gateway and a method in a protocol conversion gateway according to the independent claims attached below.

According to an aspect a method in a protocol conversion gateway for enabling a client, which client does not support a Session Initiation Protocol (SIP) transport protocol, to communicate with a SIP proxy is provided. The method comprises receiving a first SIP message, over a non-standard SIP transport protocol, from the client. The method further comprises inserting a SIP address of the protocol conversion gateway in at least one header of the received SIP message, and sending the SIP message to the SIP proxy over a standard SIP transport protocol.

According to an aspect, a protocol conversion gateway configured to enable a client, which client does not support a standard Session Initiation Protocol (SIP) transport protocol, to communicate with a SIP proxy, is provided.

The protocol conversion gateway comprises a communication unit adapted to receive a SIP message, over a non-standard SIP transport protocol, from the client. The protocol conversion gateway further comprises a processing unit adapted to insert a SIP address of the protocol conversion gateway in at least one header of the received SIP message. Further, the communication unit further is adapted to send the SIP message to the SIP proxy over a standard SIP transport protocol.

The protocol conversion gateway and the method therein have several advantages. One advantage is that the PGW is independent of the SIP application which the client wants to use. The client can therefore deploy SIP services purely on the client side without having to update the gateway logic. Another advantage is that already existing application logic and SIP stack can be deployed with minimal adaptation to the non-standard SIP transport protocol. There is no need to define a new application-level protocol between the client and the PGW, only the adaptation to the non-standard SIP transport protocol has to be designed.

BRIEF DESCRIPTION OF DRAWINGS

Embodiments will now be described in more detail in relation to the accompanying drawings, in which.

DETAILED DESCRIPTION

Briefly described, a protocol conversion gateway (PGW) and a method therein for enabling a client, which client does not support a standard Session Initiation Protocol (SIP) transport protocol, to communicate with a SIP proxy are provided.

An exemplifying embodiment of such a method will now be described with reference to FIG. 1 which is a flowchart of an exemplifying embodiment of a method in a PGW for enabling SIP communication over a non-standard SIP transport protocol.

Figure 1:
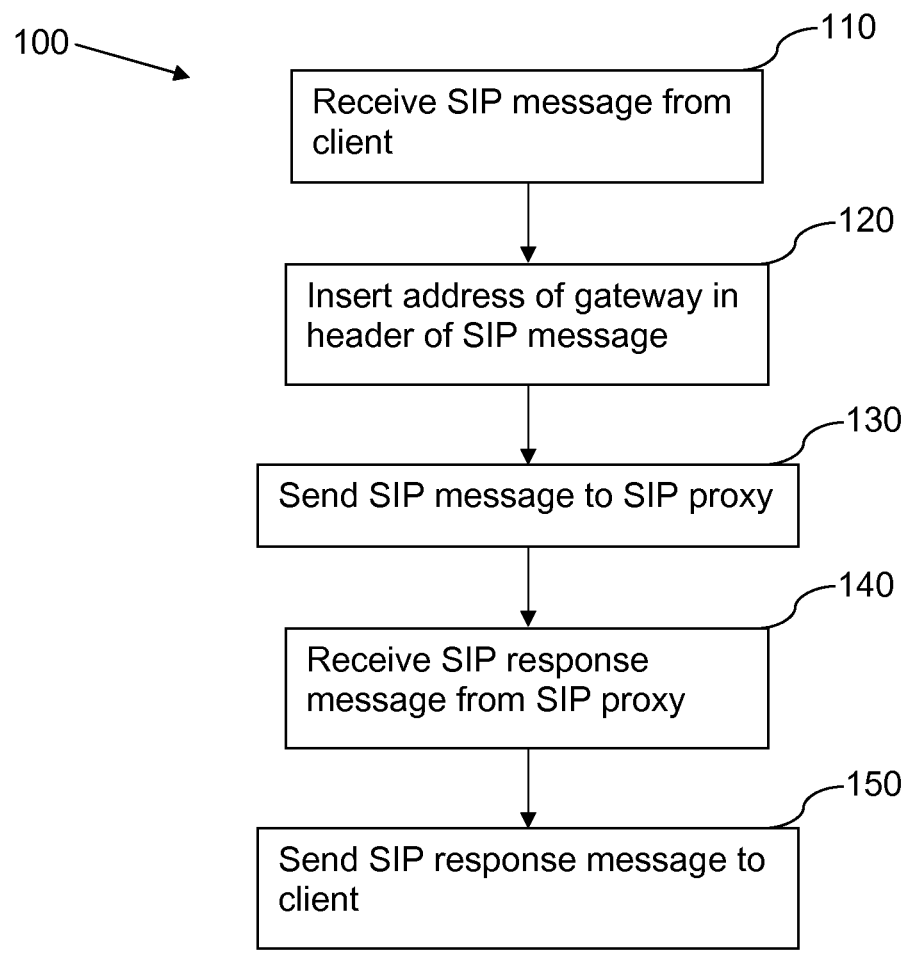
FIG. 1 is a flowchart of an exemplifying embodiment of a method for enabling SIP communication over a non-standard SIP transport protocol.

According to FIG. 1, the exemplifying embodiment of the method in a PGW for enabling a client, which client does not support a Session Initiation Protocol (SIP) transport protocol, to communicate with a SIP proxy, comprises receiving 110 a first SIP message, over a non-standard SIP transport protocol, from the client. The method further comprises inserting 120 a SIP address of the PGW in at least one header of the received SIP message, and sending 130 the SIP message to the SIP proxy over a standard SIP transport protocol.

The client communicates with the PGW over a non-standard SIP protocol. This means that that the client may be able to generate the SIP message but the client has no knowledge of SIP addresses and/or any standard SIP transport protocol. The client uses the transport protocol which the client has access to and sends the generated SIP message to the PGW by means of the non-standard SIP transport protocol. An example of such a non-standard SIP transport protocol is Hypertext Transport Protocol (HTTP) protocol. The PGW receives 110 the SIP message over the non-standard SIP transport protocol. According to the method, the PGW then inserts 120 a SIP address of the PGW in at least one header of the received SIP message. By inserting its own SIP address into at least one header of the received SIP message, the SIP message is completed or amended so that it may be sent 130 on to a SIP proxy over a standard SIP transport protocol. This further also means that the SIP proxy will have the SIP address of the PGW so that the SIP proxy may send any SIP message destined for the client to the PGW.

This has several advantages. One advantage is that the PGW is independent of the SIP application which the client wants to use. The client can therefore deploy SIP services purely on the client side without having to update the gateway logic. Another advantage is that already existing application logic and SIP stack can be deployed with minimal adaptation to the non-standard SIP transport protocol. There is no need to define a new application-level protocol between the client and the PGW, only the adaptation to the non-standard SIP transport protocol has to be designed.

According to an embodiment, the at least one header is created by the PGW.

In this example, the client generates the SIP message without the at least one header and sends the SIP message to the PGW. This means that after the PGW receives the SIP message from the client, the PGW generates or creates the at least one header and then inserts the SIP address of the PGW in the created at least one header. Once the at least one header is created, added to the SIP message and the SIP address of the PGW is inserted in the header, the SIP message is sent to the SIP proxy over the standard SIP transport protocol.

According to an embodiment, the at least header is created by the client.

In this example, the client generates a complete SIP message and sends it to the PGW. This means that after the PGW receives the SIP message from the client, the PGW inserts the SIP address of the PGW in the at least one header of the SIP message and sends the SIP message to the SIP proxy over the standard SIP transport protocol.

According to an embodiment, the at least one header is a Via header or a Contact header.

A SIP message typically comprises different headers. The different headers have different objects. In this example, the SIP address of the PGW is inserted in the Via header or in the Contact header. In another embodiment, the SIP address of the PGW is inserted in both the Via and the Contact header.

According to an embodiment, the method further comprises receiving 140, from the SIP proxy, a SIP response message and sending 150 the SIP response message to the client over the non-standard SIP transport protocol.

As was described above, the SIP proxy has the SIP address of the PGW so that the SIP proxy may send any SIP message destined for the client to the PGW, since the PGW inserted its own SIP address in the at least one header. As the SIP proxy sends a SIP response message, or any other SIP message, the SIP proxy will send such messages to the PGW. The PGW receives 140 the SIP message over the standard SIP transport protocol and forwards, or sends 150, the SIP message to the client over the non-standard SIP transport protocol.

According to an embodiment, the received first SIP message from the client is a REGISTER request message.

In this example, the client wishes to register itself with a SIP registrar. This is done in order to later on be reachable from other SIP proxies or SIP endpoints. The SIP REGISTER request message comprises information about the client, such as Contact header information. This will give the SIP proxy or SIP endpoint knowledge about how to reach the client. As the SIP REGISTER request message is transferred over the non-standard SIP transport protocol, information about the non-standard SIP endpoint is implicitly provided. One example of such information is address of the client on the non-standard SIP protocol.

According to an embodiment, a connection request message has been previously received from the client prior to the reception 110 of the first SIP message from the client, wherein a context has been created in the PGW for the client and wherein address information of the client has been stored.

In order for the client and the PGW to have knowledge about each other such as address information for example, the client has previously sent a connection request message to the PGW. The PGW creates a context for the client as the connection request message is received. In the context, the PGW stores information about the client, such as for example the address on the non-standard SIP transport protocol and Contact header information related to the client including the Contact address allocated for the client by the PGW.

In the example that the non-standard SIP transport protocol is HTTP, the PGW creates a web socket for the client and when a SIP message is received from the SIP proxy destined for the client, the PGW fetches the address on the non-standard SIP transport protocol, i.e. the web socket in this example, and sends the SIP message to the client over the non-standard SIP transport protocol on the web socket.

According to an embodiment, the received first SIP message from the client comprises a dummy address in the at least one header, and wherein when the PGW receives the SIP response message from the SIP proxy, the method comprises inserting the dummy address in the at least one header before sending the SIP response message to the client over the non-standard SIP transport protocol.

In case the client generates a complete SIP message including the at least one header, the PGW inserts its own SIP address into the at least one header. In this example, the client inserts a dummy address into the at least one header before sending the SIP message to the PGW. The PGW saves the dummy address in the context of the client and inserts its own SIP address into the at least one header. In other words, the PGW replaces the dummy address in the at least one header with its own SIP address. Then the PGW sends the SIP message to the SIP proxy over the standard SIP transport protocol.

According to an embodiment, the SIP proxy is one of a SIP proxy, a SIP server, a SIP endpoint or a node in a SIP based communication network.

The PGW may communicate with a SIP proxy which acts as a SIP endpoint. Alternatively, the SIP proxy forwards all communication from the PGW to a SIP server, SIP endpoint or other node in a SIP based communication network. Likewise, the SIP proxy forwards communication from a SIP server, SIP endpoint or other node in a SIP based communication network to the PGW. Examples of a SIP endpoint are a Session Boarder Gateway (SBG) or a Proxy Call Session Control Function (P-CSCF).

According to an embodiment, the method further comprises receiving, from the SIP proxy, a further SIP message over the standard SIP transport protocol destined for the client and forwarding the received SIP message to the client over the non-standard SIP transport protocol.

Embodiments herein also relate to a PGW. The PGW has the same objects, technical features and advantages as the method performed in the PGW just described above. The PGW will only be described in brief in order to avoid unnecessary repetition.

Figure 2:
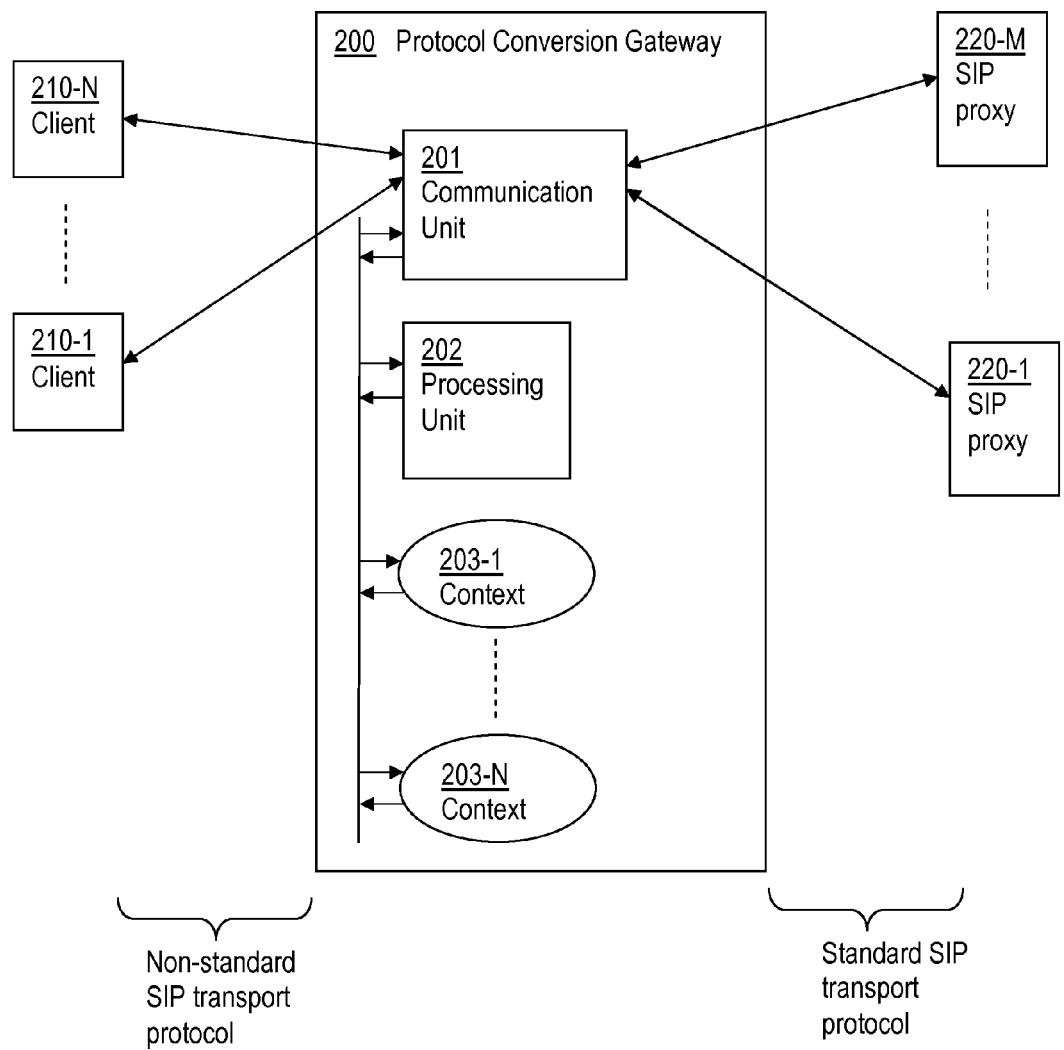
FIG. 2 is a block diagram illustrating an exemplifying embodiment of a protocol conversion gateway.

FIG. 2 is a block diagram illustrating an exemplifying embodiment of a protocol conversion gateway.

FIG. 2 illustrates the exemplifying embodiment of the PGW 200 configured to enable a client 210, which client does not support a standard Session Initiation Protocol (SIP) transport protocol, to communicate with a SIP proxy 220, comprising a communication unit 201 adapted to receive a SIP message, over a non-standard SIP transport protocol, from the client 210. The PGW 200 further comprises a processing unit 202 adapted to insert a SIP address of the protocol conversion gateway in at least one header of the received SIP message. Further, the communication unit 201 further is adapted to send the SIP message to the SIP proxy 220 over a standard SIP transport protocol.

In FIG. 2, the PGW 200 is illustrated being adapted to communicate with a plurality of clients 210-1, . . . , 210-N, where N is the total number of clients. When referring to the client in this description, numeral 210 is used for simplicity instead of using 210-1, 210-2 and so on. Likewise, the PGW 200 is illustrated being adapted to communicate with a plurality of SIP proxies 220-1, . . . , 220-M, where M is the total number of SIP proxies. When referring to the SIP proxy, the numeral 220 is used for the same simplicity reasons as for the client 210. It shall further be noted that there may exist a plurality of PGWs 200 even though just one is illustrated in FIG. 2.

According to an embodiment, the processing unit 202 is further adapted to create the at least one header.

According to another embodiment, the at least one header is created by the client.

According to an embodiment, the at least one header is a Via header or a Contact header.

According to an embodiment, the communication unit 201 is further adapted to receive, from the SIP proxy, a SIP response message and to send the SIP response message to the client over the non-standard SIP transport protocol.

According to an embodiment, the received first SIP message from the client is a REGISTER request message.

According to an embodiment, a connection request message has been previously received from the client prior to the reception of the first SIP message from the client, wherein the processing unit 202 is adapted to create a context 203 for the client 210 and to store address information of the client in the context.

According to an embodiment, the received first SIP message from the client 210 comprises a dummy address in the at least one header, and wherein the PGW 200 is adapted to receive the SIP response message from the SIP proxy 220, and to insert the dummy address in the at least one header before sending the SIP response message to the client over the non-standard SIP transport protocol.

According to an embodiment, the SIP proxy 220 is one of a SIP proxy, a SIP server, a SIP endpoint or a node in a SIP based communication network.

According to an embodiment, the communication unit 201 is adapted to receive a further SIP message over the standard SIP transport protocol destined for the client 210 and to forward the received SIP message to the client over the non-standard SIP transport protocol.

Figure 3:
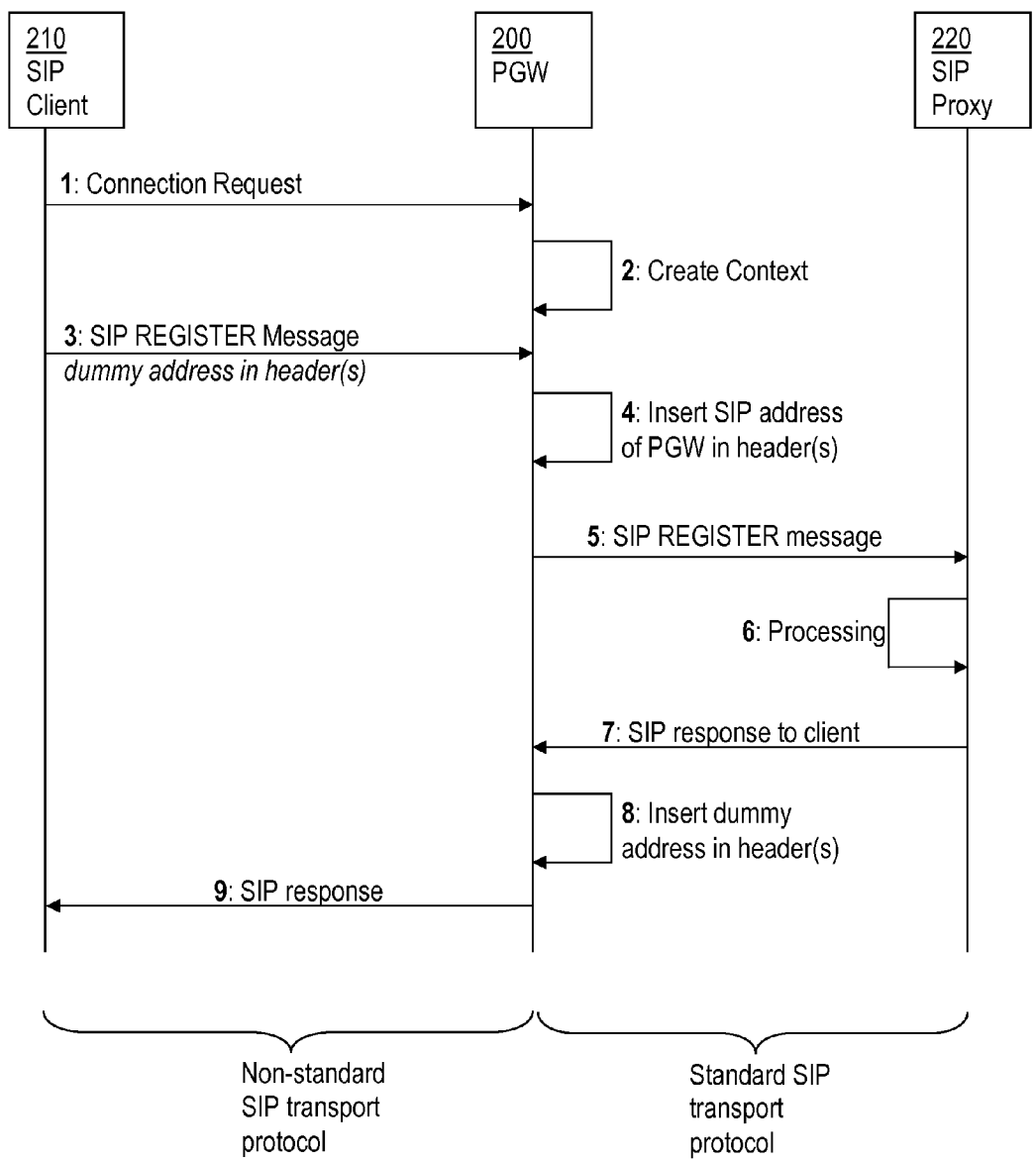
FIG. 3 is a signalling diagram of an exemplifying embodiment of a method for enabling SIP communication over a non-standard SIP transport protocol.

FIG. 3 is a signalling diagram of an exemplifying embodiment of a method for enabling SIP communication over a non-standard SIP transport protocol. In this example, the non-standard SIP protocol is a web socket protocol which is an HTTP extension which facilitates the implementation of asynchronous communication for web applications. An alternative to the web socket protocol is a standard HTTP using long polling technique.

FIG. 3 illustrates the method in the PGW 200 comprising receiving a signal 1: Connection Request from the client 210. The Connection Request is sent from the client 210 to the PGW 200 over a non-standard SIP transport protocol and it comprises e.g. identity and address of the client 210. The message Connection Request message is received by the PGW 200, in this example, at a specific web socket in the PGW. The PGW 200 then 2: creates a context for the client, in which context the PGW stores e.g. the Contact header information of the client including the Contact address allocated by the PGW 200 to the client 210 and also which web socket the Connection Request was received at.

Thereafter, the PGW 200 receives at some point in time a signal 3: SIP REGISTER message from the client 210. The SIP REGISTER message is used by the client 210 to register itself with a SIP Proxy or SIP server 220. The Via and Contact headers of the SIP REGISTER message do not comprise a correct SIP endpoint address of the client as the message is sent over a non-standard SIP transport protocol and the client does not know the SIP address of the PGW. As a consequence, the client cannot generate an endpoint specification part of the SIP message. In this example, the client 210 creates a full SIP message including headers and inserts a dummy address in the Via and the Contact header of the SIP REGISTER message.

The PGW 200 stores the Contact header information including the dummy address in the context of the client 210, allocates a Contact address, and then 4: replaces the Contact address with the Contact address allocated for the client. Additionally it inserts its SIP address in the Via header of the SIP request. Thereafter, the PGW 200 forwards or sends 5: the SIP REGISTER message to the SIP proxy 220. When the PGW 200 sends the SIP REGISTER message to the SIP proxy 220, the PGW 200 remembers that this SIP transaction belongs to a given web socket. In the Via header, a transaction ID is already comprised, e.g. as a branch parameter, which transaction ID is generated by the client 210.

The SIP proxy or SIP server 220 6: processes the SIP REGISTER message and generates a response to the SIP REGISTER message. The SIP proxy 220 then sends 7: the SIP response message towards the client via the PGW 200. Since the PGW 200 has replaced the dummy address with its own SIP address in the Via header, the SIP proxy 220 receives the SIP REGISTER message comprising the SIP address of the PGW 200. As a consequence, the SIP proxy 220 sends the generated response to the PGW 200. When the PGW 200 receives the SIP response message from the SIP proxy 220, the PGW 200 then 8: inserts the dummy address into the Via and the Contact header and then sends 9: the SIP response message to the client 210. The PGW 200 uses a transaction ID of e.g. the SIP REGISTER request message or the SIP response message, which is transferred in the Via header in order to obtain the dummy address and the web socket over which the client is connected to the PGW.

Figure 4:
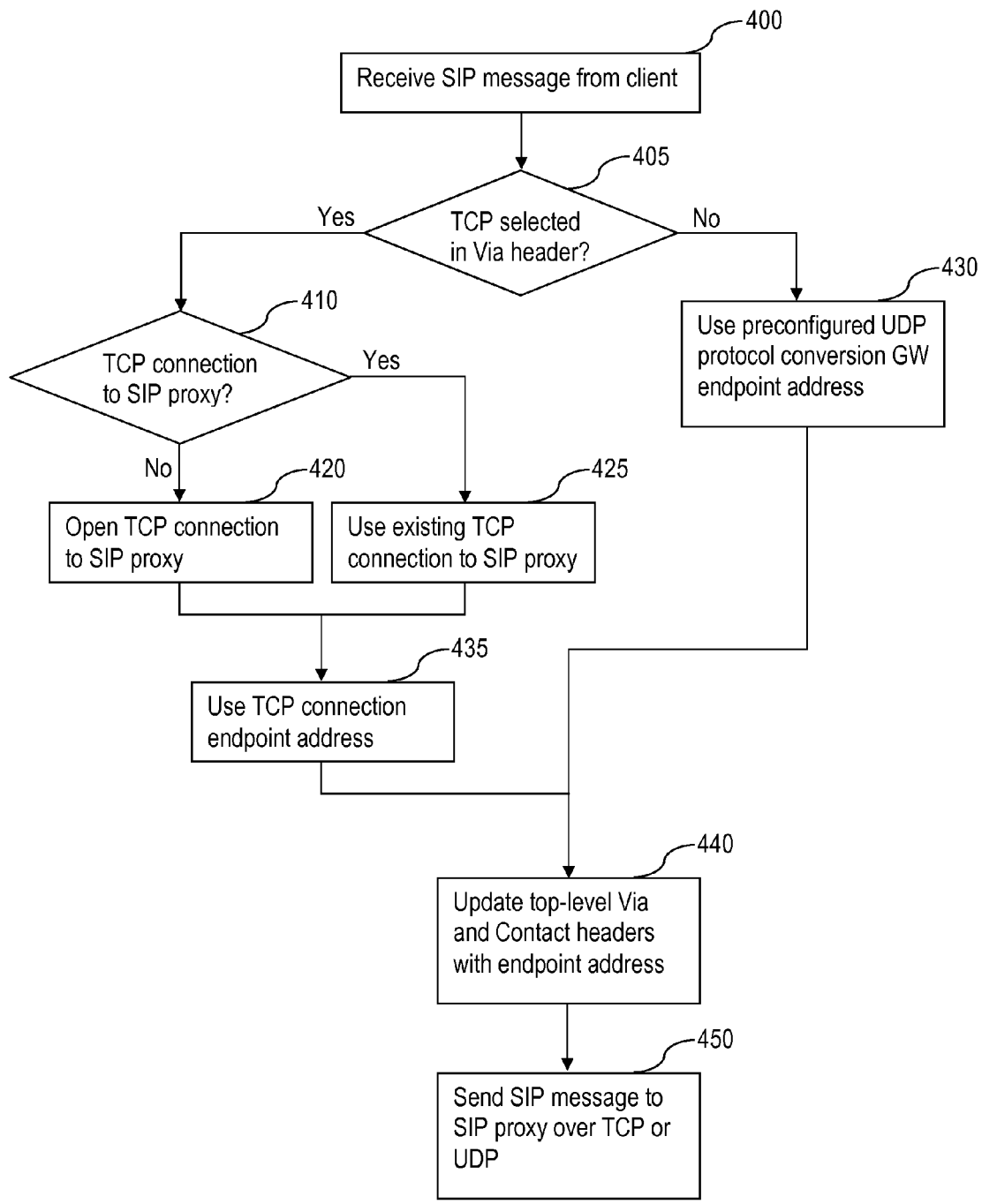
FIG. 4 is a flowchart of an exemplifying embodiment of a method for enabling SIP communication over a non-standard SIP transport protocol.

FIG. 4 is a flowchart of an exemplifying embodiment of a method for enabling SIP communication over a non-standard SIP transport protocol.

In this example, the PGW receives 400 a SIP message from the client. The PGW checks 405 if Transport Control Protocol (TCP) is selected or indicated in a Via header of the SIP message. This means that the client has selected TCP to be the standard SIP transport protocol to be used by the PGW to send the SIP message to the SIP proxy.

If TCP is selected, then the PGW checks 410 if it has a TCP connection open to a SIP proxy. If this is the case, the PGW uses 425 this existing TCP connection to the SIP proxy, the PGW uses 435 the TCP connection endpoint address. This means that the PGW now know which port or connection it shall use to later on send the SIP message to a SIP proxy. The PGW updates 440 the Via and the Contact header to comprise the SIP address of the PGW and then sends 450 the SIP message to the SIP proxy over TCP transport protocol, which is a standard SIP transport message.

If the check 405 indicates that TCP is not selected in the Via header, then the PGW uses 430 pre-configured User Datagram Protocol (UDP) conversion gateway endpoint address. UDP is also a standard SIP transport protocol and the PGW uses its own SIP address in this case. Then the PGW updates 440 the Via and the Contact header to comprise the SIP address of the PGW and then sends 450 the SIP message to the SIP proxy over the UDP transport protocol.

Figure 5:
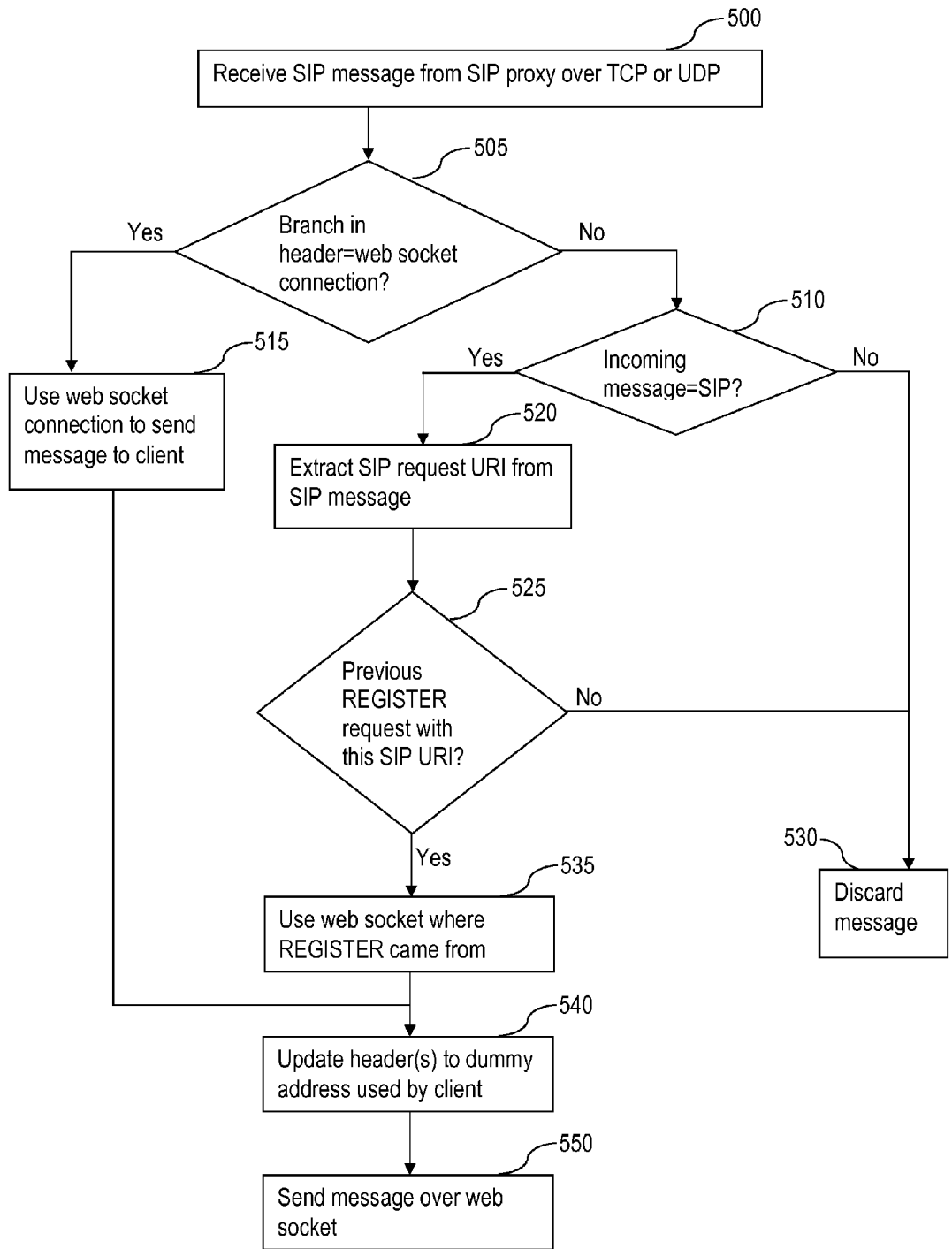
FIG. 5 is a flowchart of an exemplifying embodiment of a method for enabling SIP communication over a non-standard SIP transport protocol.

If the check 405 indicates that TCP is selected in the Via header but the check 410 if it has a TCP connection open to a SIP proxy indicates that there is no TCP connection to the SIP proxy, then the method comprises the PGW opening 420 a TCP connection to the SIP proxy, using 435 the TCP connection endpoint address and updating 440 the Via and the Contact header to comprise the SIP address of the PGW and then sending 450 the SIP message to the SIP proxy over TCP FIG. 5 is a flowchart of an exemplifying embodiment of a method for enabling SIP communication over a non-standard SIP transport protocol.

In this example, the non-standard SIP transport protocol is the web socket protocol. The PGW receives 500 a SIP message from the SIP proxy. The SIP message is sent from the SIP proxy to the PGW either via the UDP or the TCP transport protocol.

The PGW checks 505 is the Via header of the SIP message comprises a branch which is assigned to a web socket connection. If the Via header does not comprise a branch which is assigned to a web socket connection, the PGW checks 510 if the received or incoming message is a SIP request. In the case the received message is not a SIP request message, the message is discarded 530.

In the case that the check 505 indicates that the Via header of the SIP message comprises a branch which is assigned to a web socket connection, then the PGW uses 515 the web socket to send the message to the client. The PGW updates 540 the Contact and the Via headers to comprise the dummy address previously used by the client and sends 550 the message over the web socket.

In the case that the check 505 indicates that the Via header of the SIP message does not comprise a branch which is assigned to a web socket connection but the check 510 indicates that the received message is a SIP request, then the PGW extracts 520 the SIP request Uniform Resource Identifier (URI) from the SIP request. Then the PGW checks 525 if a SIP REGISTER request has been previously received comprising the SIP URI. If no SIP REGISTER request has been previously received comprising the SIP URI, the PGW discards 530 the message. On the other hand, if a SIP REGISTER request comprising the SIP URI has been previously received, the PGW uses 535 the web socket at which that SIP REGISTER request was received. The PGW updates 540 the Contact and the Via headers to comprise the dummy address previously used by the client and sends 550 the message over the web socket.

The embodiments described above enables a client to connect to a SIP infrastructure without being able to use a standard SIP protocol.

It should be noted that FIG. 2 merely illustrates various functional units in the protocol conversion gateway in a logical sense. The functions in practice may be implemented using any suitable software and hardware means/circuits etc. Thus, the embodiments are generally not limited to the shown structures of the protocol conversion gateway and the functional units. Hence, the previously described exemplary embodiments may be realised in many ways. For example, one embodiment includes a computer-readable medium having instructions stored thereon that are executable by the processing unit for performing the functions of the protocol conversion gateway. The instructions executable by the processing unit and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

What is claimed is:

1. A method in a protocol conversion gateway for enabling a client that does not support a Session Initiation Protocol (SIP) transport protocol to communicate with a SIP proxy, the method comprising:
  receiving a first SIP message, over a non-standard SIP transport protocol, from the client, wherein the first SIP message includes a first header and a second header that each comprise a dummy address created by the client;
  allocating a contact address for the client;
  replacing the dummy address of the first header with a SIP address of the protocol conversion gateway and also replacing the dummy address of the second header with the allocated contact address for the client to make an amended SIP message;
  sending said amended SIP message to the SIP proxy over a standard SIP transport protocol;
  receiving, from the SIP proxy, a SIP response message that also includes the first header and the second header;
  inserting the dummy address into both the first header and the second header of the received SIP response message to make an amended SIP response message; and
  sending said amended SIP response message to the client over said non-standard SIP transport protocol.

2. The method according to claim 1, wherein said first header is a Via header and said second header is a Contact header.

3. The method according to claim 1, wherein said received first SIP message from the client is a REGISTER request message.

4. The method according to claim 1, further comprising:
receiving a connection request message from the client prior to said reception of said first SIP message over said non-standard SIP transport protocol from the client;
creating a context in the protocol conversion gateway for the client; and
storing the allocated contact address of the client as part of the context.

5. The method of claim 4, further comprising:
storing, as part of the context, an identifier of a web socket where the connection request message was received at.

6. The method of claim 5, further comprising:
obtaining, based upon the received SIP response message, the dummy address and the identifier of the web socket,
wherein the sending of the amended SIP response message occurs using the web socket.

7. The method according to claim 1, wherein said SIP proxy is one of a SIP proxy, a SIP server, a SIP endpoint or a node in a SIP based communication network.

8. The method according to claim 1, further comprising:
receiving a further SIP message over the standard SIP transport protocol destined for the client; and
forwarding the received SIP message to the client over the non-standard SIP transport protocol.

9. A protocol conversion gateway configured to enable a client that does not support a standard Session Initiation Protocol (SIP) transport protocol to communicate with a SIP proxy, the protocol conversion gateway comprising:
a processing unit; and
a computer-readable medium having instructions stored thereon which, when executed by the processing unit, cause the protocol conversion gateway to:
receive a SIP message over a non-standard SIP transport protocol from the client, wherein the SIP message includes a first header and a second header that each comprise a dummy address created by the client,
allocate a contact address for the client,
replace the dummy address of the first header with a SIP address of the protocol conversion gateway and also replace the dummy address of the second header with the allocated contact address for the client to create an amended SIP message,
send the amended SIP message to the SIP proxy over a standard SIP transport protocol,
receive, from the SIP proxy, a SIP response message that also includes the first header and the second header,
insert the dummy address into both the first header and the second header of the received SIP response message to create an amended SIP response message, and
send the amended SIP response message to the client over said non-standard SIP transport protocol.

10. The protocol conversion gateway according to claim 9, wherein said first header is a Via header and said second header is a Contact header.

11. The protocol conversion gateway according claim 9, wherein said received SIP message from the client is a REGISTER request message.

12. The protocol conversion gateway according to claim 9, wherein the instructions, when executed by the processing unit, further cause the protocol conversion gateway to:
to receive a connection request message from the client prior to the reception of said SIP message from the client; and
create a context for the client and to store address information of the client in the context.

13. The protocol conversion gateway of claim 12, where the instructions, when executed by the processing unit, further cause the protocol conversion gateway to:
store, as part of the context, an identifier of a web socket where the connection request message was received at.

14. The protocol conversion gateway of claim 13, where the instructions, when executed by the processing unit, further cause the protocol conversion gateway to:
obtain, based upon the received SIP response message, the dummy address and the identifier of the web socket,
wherein the amended SIP response message is sent using the web socket.

15. The protocol conversion gateway according to claim 9, wherein said SIP proxy is one of a SIP proxy, a SIP server, a SIP endpoint, or a node in a SIP based communication network.

16. The protocol conversion gateway according to claim 9, wherein the instructions, when executed by the processing unit, further cause the protocol conversion gateway to:
receive a further SIP message over the standard SIP transport protocol destined for the client; and
forward the received further SIP message to the client over the non-standard SIP transport protocol.

* * * * *

UNITED STATES PATENT AND TRADEMARK OFFICE
CERTIFICATE OF CORRECTION

| | |
|---|---|
| PATENT NO. | : 9,288,237 B2 |
| APPLICATION NO. | : 13/612579 |
| DATED | : March 15, 2016 |
| INVENTOR(S) | : Paller et al. |

It is certified that error appears in the above-identified patent and that said Letters Patent is hereby corrected as shown below:

On the Title Page

Item (74), under "Attorney, Agent, or Firm", in Column 2, Line 2, delete "Eliott," and insert -- Elliott, --, therefor.

In the Claims

In Column 10, Line 12, in Claim 11, delete "according claim" and insert -- according to claim --, therefor.

Signed and Sealed this
Thirty-first Day of May, 2016

Michelle K. Lee
*Director of the United States Patent and Trademark Office*